Dec. 12, 1950 J. D. CARPENTER 2,533,429
WING FOLD MECHANISM
Filed Dec. 9, 1949 2 Sheets-Sheet 1
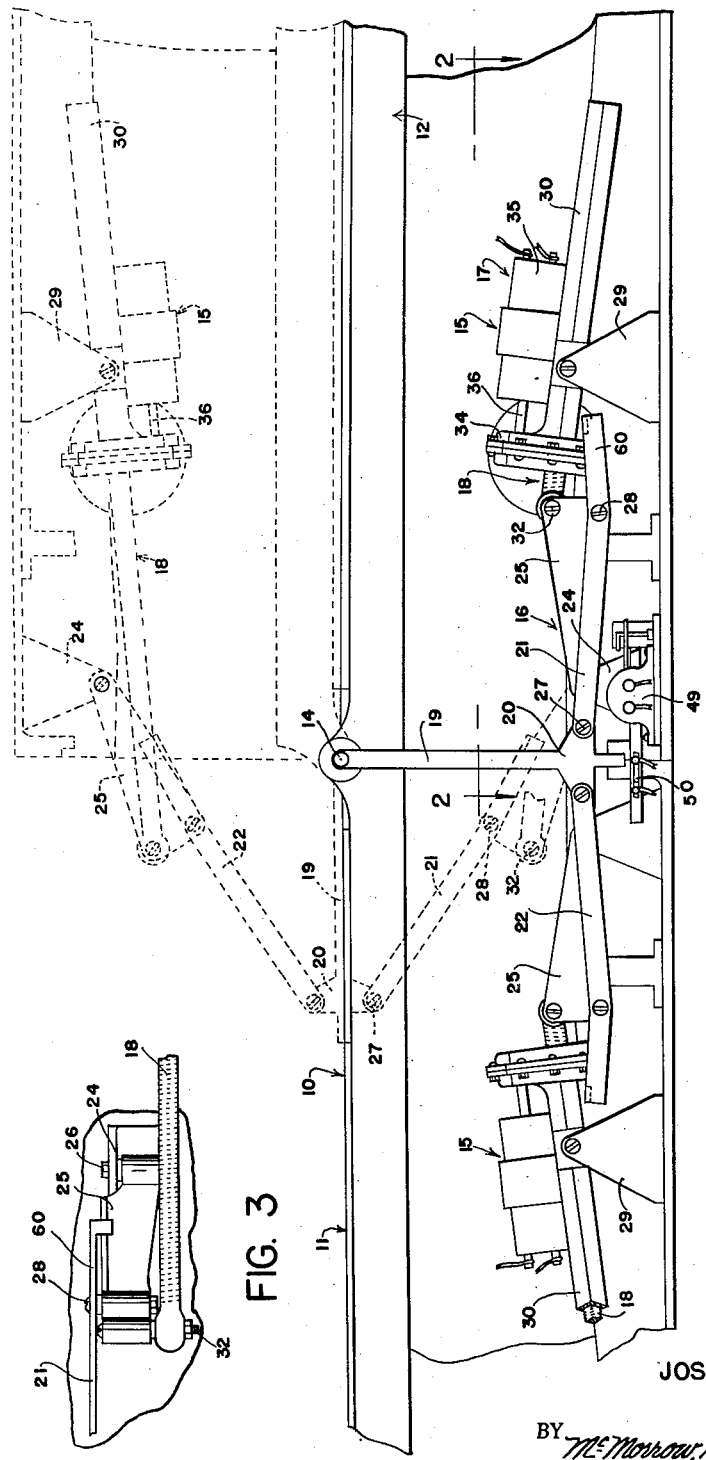
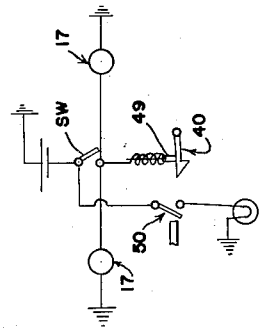
INVENTOR
JOSEPH D. CARPENTER
BY McMorrow, Berman & Davidson
ATTORNEYS Dec. 12, 1950  J. D. CARPENTER  2,533,429
WING FOLD MECHANISM
Filed Dec. 9, 1949  2 Sheets-Sheet 2
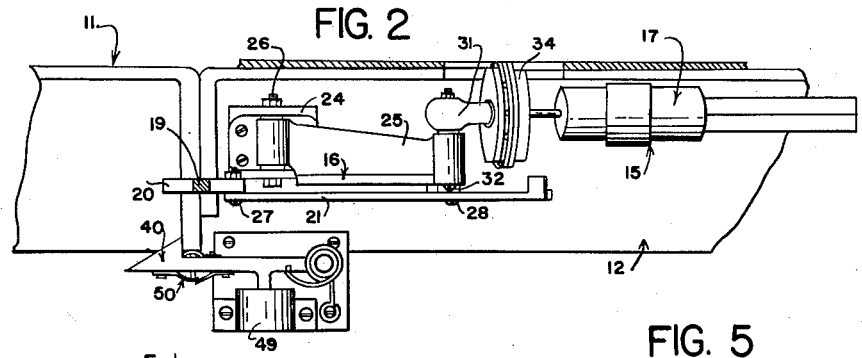
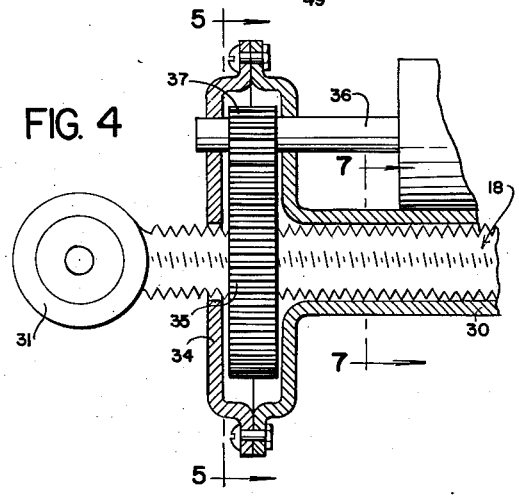
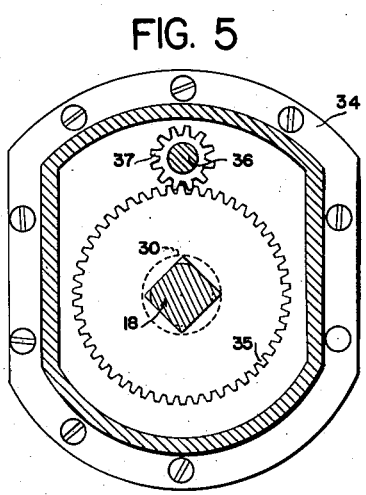
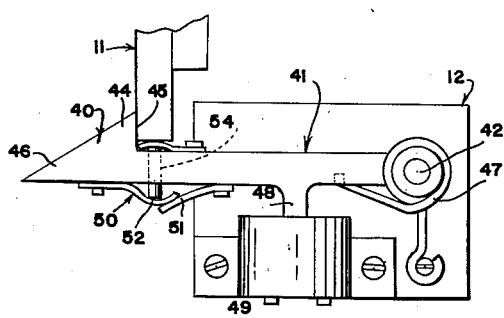
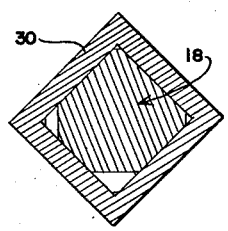
INVENTOR
JOSEPH D. CARPENTER
BY
M<sup>c</sup>Morrow Berman & Davidson
ATTORNEYS Patented Dec. 12, 1950

2,533,429

UNITED STATES PATENT OFFICE 2,533,429

WING FOLD MECHANISM

Joseph D. Carpenter, Ottumwa, Iowa

Application December 9, 1949, Serial No. 132,012

4 Claims. (Cl. 74—469)

This invention relates to a wing folding mechanism, and more particularly to a novel wing folding mechanism for folding the panels of the wings of an aircraft from an aligned, extended position to a folded, retracted position.

It is an object of this invention to provide a novel wing folding mechanism for folding the wings of an aircraft or the like from an aligned, extended position to a folded, retracted position, the wing panels being disposed in an overlying position in the fully retracted position thereof.

Another object of this invention is to provide a toggle link mechanism in a wing folding device of this kind, the links being arranged for locking the wing panels in their extended positions and having a locking device or element carried by certain of the toggle linkage mechanism engageable for locking the wing panels in their folded or retracted positions.

A further object of this invention is to provide a novel wing folding device of this kind having toggle link elements carried by the respective adjacent wing panels and having a screw or bolt element carried by the panels engaging the linkage for moving the toggle links in a manner to extend or retract the wing panels.

Still another object of this invention is to provide a novel wing folding mechanism, of the kind to be more particularly described hereinafter, having locking means embodied in the toggle link mechanism for securing the wing panels in their extended and folded positions and having separate locking devices engageable with the respective wing panels for rigidly securing the panels in their extended positions.

A still further object of this invention is to provide an electric means for rotating a nut element engageable with the extensible bolt carried by one of the wing panels, for rotating the nut and extending the bolt for extending the toggle link mechanism and folding the wing panels.

A still further object of this invention is to provide a wing folding device which is engageable on adjacent panels or portions of the foldable wings of an aircraft, the foldable wing sections or elements being disposed spanwise or chordwise of the wings. The folding elements are actuated in the same manner whether the relative wing panels will be folded along the span of the wings or along the chord thereof. It is the intention of this invention that such a folding device may be readily applied to the folding wings of an aircraft where the folding wings are to be folded outwardly from the longitudinal axis of the aircraft fuselage or whether the wing panels are to be folded upwardly from the leading edge and downwardly from the trailing edge.

With the above and other objects in view, my invention consists in the arrangement, combination and details of construction disclosed in the drawings and specification, and then more particularly pointed out in the appended claims.

In the drawings:

Figure 1 is a side elevation of the folding mechanism constructed according to an embodiment of this invention, the folding mechanism being shown in full lines in the extended position of the wing panels and in dotted lines in the folded position thereof;

Figure 2 is a longitudinal section taken on the line 2—2 of Figure 1;

Figure 3 is a fragmentary top plan view of a portion of the folding mechanism showing the engagement of the extensible bolt element and the toggle linkage in the extended position;

Figure 4 is a longitudinal section of the gear housing and connection of the electric motor to the rotatable nut element for extending the bolt member;

Figure 5 is a transverse section taken on the line 5—5 of Figure 4;

Figure 6 is a top plan view of the latch and switch for securing the wing members in their extended positions and indicating such condition on an alarm circuit;

Figure 7 is a transverse section taken on the line 7—7 of Figure 4;

Figure 8 is a diagrammatic showing of the electrical circuit on the wing folding mechanism of this invention.

Referring to the drawings, the numeral 10 designates generally the wing of an aircraft or the like having a pair of panel members 11 and 12 hingedly connected together for folding along the length thereof. While the panel members 11 and 12 are indicated in the drawings as spanwise, it will be readily understood that such members may be chordwise for folding along the chord of the members. The panel members 11 and 12 are hingedly connected together by a hinge pin 14 which is carried on the upper side thereof and will preferably be carried by the main beam or spar of the airplane. A panel folding mechanism 15 is positioned within each of the panel members 11 and 12 and each is operatively connected to the hinge pin 14 in the manner clearly shown in Figure 1 of the drawings. Since the specific structure of the folding mechanism 15 is the same, only one will be specifically described.

The wing folding mechanism 15 includes a toggle linkage mechanism 16 connected to the hinge pin 14 by means of a link 19. The toggle linkage mechanism is driven or actuated by electric means 17 which includes an extensible element or bolt 18.

As clearly shown in Figure 1, the link 19 is hingedly mounted on the hinge pin 14 and depends within the wing structure 10. A transverse cross-arm 20 is formed on the lower end of the link 19 and extends partially within the outer panel member 12 and within the inner panel member 11 to form a connection for the linkage mechanism in each of the panel members. A first link 21 is positioned longitudinally of and within the panel member 12 and on one side of the cross arm 20 and has one end pivotally connected to said cross arm 20 by means of a pin 27.

Arranged within and extending longitudinally of the panel member 12 is a lever member 25 which has one end pivotally connected as by a pin 26 carried by the top of a pedestal 24 fixedly supported within the panel member 12, the other end of the lever 25 being pivotally connected to the link 21 adjacent to and spaced from its other end by means of a pin 28.

As shown in Figure 1, the lever 25 is substantially triangular in configuration, with the apex thereof pivotally connected to the pedestal 24 by the pin 26 with the pivot pin 28 extending through the lower side of the wide end of the lever 25 in the folded position.

A bracket 29 is fixed within the wing structure 10 in the outer panel 12 for pivotally mounting the actuating mechanism 16 for folding the toggle linkage from the extended to the retracted position and for folding and extending the wing members 11 and 12. An elongated, rectangular tube 30 is hingedly or swingably mounted on the bracket 29, the bracket 29 engaging the tubular member 30 adjacent the forward end thereof or the end closely adjacent the adjacent wing member 11. The bolt 18 is slidably received within the housing 30 for sliding along the length thereof and extends outwardly from the housing in the direction of the adjacent wing panel or member. The bolt 18 is formed with an eye 31 at the ends thereof extending outwardly from the housing 30 and a pivot pin 32 secures the eye 31 to the lever 25 spaced from the pivot pin 28 at the other end from the fulcrum pin 26.

A gear housing 34 is fixedly carried by the open end of the tubular member 30 for enclosing therein a gear 35 having a central aperture threadably grooved for threaded engagement with the bolt 18. An electric motor 35 is carried by the tubular member 30 over the bracket 29, and the motor shaft 36 extends into the housing 34. A spur gear 37 is fixed on the motor shaft 36 and engages the driving gear 35 for rotating the driving gear which constitutes the nut element engageable with the bolt 18 for extending the bolt 18 from the tubular housing 30 and retracting it therein.

A portion of the wing forming mechanism has been described above as carried in one of the wing sections or members, and a similar wing folding mechanism, including an identically arranged toggle link mechanism, bolt and electric motor, is carried by the adjacent wing section, panel or member, so that the two wing folding mechanisms act in unison for folding the wing sections from a fully extended, aligned position to a fully folded and overlying position, clearly noted in Figure 1 of the drawings. The wing folding mechanism 15, described above, will be sufficient for moving one of the wing members from an aligned position to a position 90° relative to the other wing member, and the folding mechanism in the other wing member will be sufficient for completing the folding of the two wing members from a fully aligned position to an overlying position completing a 180-degree folding movement of the wing members to be folded.

For securing the wing members 11 and 12 in their aligned position, while the toggle action of the toggle linkage 16 described above may be sufficient for rigidly locking the two wing members, a separate latch 40 is provided for positively securing the members in their extended position, as for flight. The latch mechanism 40 includes a latch hook member 41 which is swingably mounted on one of the wing members, as the wing member 12, by a pivot bolt 42. The hook 44 on the other end of the latch member 41 is adapted to hookingly engage about a portion of the adjacent wing member 11 in the manner clearly noted in Figure 6 of the drawings. A portion 45 of the hook 44 will constitute an abutment member for rigidly securing the two wing panels together while the inclined surface 46 will constitute a guide means for swinging the latch 41 in a manner to receive the panel 11 as it is swung from a folded to an extended position. A coiled spring 47 engaged about the pivot pin 42 of the latch 40 constantly presses the hook 41 into locking engagement with the adjacent wing panel 11. An outwardly extending arm or armature 48 is carried by the latch hook 41 intermediate the length thereof and extends outwardly through a solenoid 49 which is rigidly mounted on the first wing panel, the wing panel 12, on which the latch 40 is swingably mounted. The arm or armature 48 constitutes the core of the solenoid 49, where, upon actuation of the solenoid 49, the latch 40 will be moved about the pivot 22 against the tension of the spring 47 to a released condition to permit the separation of the wing members for folding to the folded position.

As the precise condition of the folded position of the wings is of the utmost importance to a person flying the aircraft, a safety switch 50 is carried by each of the latch members 40 and connected in an electric alarm circuit 55 for indicating to the pilot or engineer the fact that the wings are in their fully locked position. The switch 50 includes a fixed contact member 51 carried by the latch member 40 on one side thereof and a movable contact member 52 engageable with the fixed contact member 51 for completing the circuit through that switch. The movable contact member 52 is engageable with a portion of the wing member adjacent the wing member on which the switch is mounted for closing the switch. The switch-actuating element 54 is engageable with the movable contact member 52 in the locked position of the wings for moving the movable element 52 into circuit engagement with the fixed contact element 51 and thereby closing the circuit 55.

In the use and operation of the wing folding mechanism, described above, the wings will be normally positioned in extended position, as clearly noted in full lines in Figure 1 of the drawings, for actuating the mechanism to move the wings to the dotted line relation, clearly noted in dotted lines in Figure 1 of the drawings, the switch to the electric circuit 55 is closed in the cockpit, whereupon the solenoid 49 is actuated for releasing the latch 40 from its engagement with the inner wing panel 11. The motors 15 are energized for rotating the nut element or gear 35. Upon rotation of the gear 35, the bolts 18 will be extended from the tubular housing 40 and the levers 25 will be moved or rocked about their respective pivots 26 in confronting relation to each other. As the lever 25, in the outer panel, is lifted upwardly about its respective fulcrum, the link member 21 will be lifted about its pivot point 27 as it is connected to the depending link 19. The pivot point 28 connecting the link 21 to the depending link 19 and lever 25 will be raised and swung in an arc upwardly about the pivot point 26, whereupon the point 27 or lower end of the connecting or common link 19 will be moved in the direction of the adjacent wing panel or member and the wing member will be folded about the hinge pin 14. The simultaneous movement of the motors 15, in the respective wing sections, will effect the pivoting of the wing members to the overlying relation noted in dotted lines in Figure 1 of the drawings. With the wing members 11 and 12 in their fully folded positions, the switch 51 will be opened for opening the circuit 55 and the alarm circuit 55 will be so arranged that upon opening of the switch 50, the indicating members 56 will note that the circuit is open.

Upon rotation of the motor shaft 36 in the opposite direction, the gears 35 will be rotated in the opposite direction for retracting the bolts 18 within the housing 30 and moving the wing panels from their folded to the extended position, and as the wing members come into aligned position, the latch 40 will be engaged for hookingly securing the two wings in their proper aligned position to prevent their movement by any means except the actuation of the motors 15.

For locking the toggle linkage 16 in the extended position or folded position of the wing members 11 and 12, the link 21 is provided with a rearwardly extending arm 60 substantially in alignment with the forwardly extending portion of the link. A transverse lug or locking element 61 is fixed to, or preferably formed integrally with, the rearwardly extending locking arm 60 and is adapted to overlie a portion of the lever 25 in the extended position of the lever for securing the linkage 16 against further rocking movement in the direction of folding the members 11 and 12.

I do not mean to confine myself to the exact details of construction herein disclosed, but claim all variations falling within the purview of the appended claims.

I claim:

1. Folding mechanism comprising a pendent link swingably mounted on the hinge pin of a pair of hingedly connected members foldable from an aligned to an overlying extended position, a pair of levers hinged on the respective members swingable from an outwardly extending position relative to each other in the aligned position of said members to an inwardly extending confronting position relative to each other in the overlying position of the members, connecting links pivoted between each of said pair of levers and said pendent link, and an extensible actuating member in each of the members connected to the respective levers for swinging the members to the extended aligned position and folded overlying position.

2. Folding mechanism comprising a link member swingably mounted on the hinge pin of a pair of hingedly connected members swingable from an extended aligned position to a folded retracted position, a pair of levers hinged on the respective members, a pair of connecting links swingable on the respective levers and hingedly connected to said first link, an elongated bolt pivoted on each of said levers remote from the fulcrums thereof, nut elements rotatable in said members and engaging the respective bolts, and means for rotating said nut elements for swinging said members to extended and folded positions.

3. Folding mechanism comprising a link member swingably mounted on the hinge pin of a pair of hingedly connected members swingable from an extended aligned position to a folded retracted position, toggle link means in each of said members connected to said link member for swinging said members to folded and extended positions, a spring-pressed latch pivoted on one of said members engageable with the other member for securing said members in aligned extended position, an elongated bolt swingably connected on the respective toggle link means, a rotatable nut member on each of said bolts, electric means for rotating said nut members, and an electric latch-releasing device connected to said electric means for releasing said latch upon actuation of said nut members for extending and folding said members.

4. Folding mechanism for a pair of panel members connected together for movement from an aligned abutting extended position to an overlying parallel folded position comprising a pair of levers arranged in end to end spaced relation positioned within said pair of members and each having the confronting end pivotally secured to the adjacent panel members for swinging movement from a position interiorly of said members to a position exteriorly thereof, connecting links having one end pivotally connected to each of the other ends of each of said levers, the other ends of each of said connecting links being connected together for movement from a position interiorly of said members to a position exteriorly of said members upon pivotal movement of said levers, and actuating means in each of said members connected to each of said levers adjacent said other end thereof for swinging said members to the extended aligned position and folded overlying position.

JOSEPH D. CARPENTER.

REFERENCES CITED

The following references are of record in the file of this patent:

UNITED STATES PATENTS

| Number | Name | Date |
| --- | --- | --- |
| 2,289,224 | Swanson | July 7, 1942 |
| 2,307,317 | Konig | Jan. 5, 1943 |
| 2,468,425 | Carpenter | Apr. 26, 1946 |
| 2,482,568 | Werner | Sept. 20, 1948 |